ary, Agent, or Firm—Wender, Murase & White

United States Patent [19]
Horst-Rudolf

[11] 4,393,951
[45] Jul. 19, 1983

[54] MEASURING DEVICE OF THE USEFUL LOAD AND OF THE LOAD ON THE AXLES OF A TRUCK

[75] Inventors: Loos Horst-Rudolf, Villars-sur-Glâne; Bernard Dupré, Marly, both of Switzerland

[73] Assignee: Vibro-Meter S.A., Fribourg, Switzerland

[21] Appl. No.: 325,647

[22] Filed: Nov. 30, 1981

[30] Foreign Application Priority Data

Dec. 9, 1980 [CH] Switzerland .......................... 9066/80

[51] Int. Cl.³ .......................................... G01G 19/08
[52] U.S. Cl. ............................ 177/136; 177/DIG. 9
[58] Field of Search .......... 177/136, 137, 255, DIG. 9

[56] References Cited

U.S. PATENT DOCUMENTS

| | | | |
|---|---|---|---|
| 3,037,380 | 6/1962 | Minke | 177/DIG. 9 |
| 3,146,839 | 9/1964 | Carlson | 177/136 |
| 3,279,550 | 10/1966 | Kersten . | |
| 3,603,418 | 9/1971 | Schmidt et al. . | |
| 3,971,451 | 7/1976 | Norberg | 177/136 X |
| 3,999,621 | 12/1976 | Wagner | 177/255 X |
| 4,020,911 | 5/1977 | English et al. . | |
| 4,042,049 | 8/1977 | Reichow et al. | 177/137 |
| 4,062,415 | 12/1977 | Miller | 177/DIG. 9 |
| 4,095,660 | 6/1978 | Johansson | 177/136 |
| 4,102,031 | 7/1978 | Reichow et al. . | |

FOREIGN PATENT DOCUMENTS

| | | | |
|---|---|---|---|
| 2143404 | 2/1973 | France . | |
| 2249787 | 5/1975 | France . | |
| 2312025 | 12/1976 | France . | |
| 991616 | 5/1965 | United Kingdom . | |
| 1310889 | 3/1973 | United Kingdom . | |
| 2043921 | 10/1980 | United Kingdom | 177/136 |

*Primary Examiner*—George H. Miller, Jr.
*Attorney, Agent, or Firm*—Wender, Murase & White

[57] ABSTRACT

The measuring device of the useful load and of the load on the axles of a truck comprises load cells mounted on a truck frame. A plate transmits the weight of the tipper and the one of the useful load to the load cells. The device comprises three load cells forming a system having three bearing points. The axis of the single front load cell is perpendicular to the common axis of the rear pair of load cells. This arrangement and the fact that each load cell is mounted on a knee-joint permits to eliminate the parasitic constraints of flexion and torsion on the load cells so that the load cells are submitted only to the constraints resulting from the weight of the tipper and the one of the useful load which improves considerably the precision of the measurement.

12 Claims, 11 Drawing Figures

MEASURING DEVICE OF THE USEFUL LOAD AND OF THE LOAD ON THE AXLES OF A TRUCK

BACKGROUND OF THE INVENTION

The invention relates to a measuring device of the useful load and of the load on the axles of a truck comprising a frame and a tipper, the measurement being effected by load cells mounted between said frame and said tipper.

According to the U.S. Pat. No. 3,927,724 an apparatus is known for holding a tipper on the frame of a vehicle and comprising an incorporated weighing device. The arrangement of the apparatus permits to prevent or to reduce the twisting constraints and the forces of elongation on the load cells utilized in the systems of weighing of vehicles. However, the device does not prevent the constraints of flexion in a plane perpendicular to the axis of the wheels of the vehicle, such constraints contributing to alter the measurement of the weight of the useful load.

The U.S. Pat. No. 3,279,550 describes a truck load measuring system in which load sensing devices are placed between the load bearing frame and the truck frame at each corner of the load bearing frame. The upper portion of the load sensing device is fixed to the load bearing frame and the lower portion to the truck frame. Both portions are connected together by welded plates which permit a limited flexion of the upper portion of the load sensing device. The load cell is mounted between an upper and a lower channel, in the middle of these channels. This permits to eliminate the effects of the lateral and shear forces on the load cell, these forces being transmitted to the truck frame by the welded plates. The only force acting on the load cell is in the direction of the axis of this cell. However, the system does not permit an axial displacement of the load bearing frame along the longitudinal axis of the truck nor the displacement along an axis perpendicular to the latter. The utilization of four load sensing devices does not either permit a rotation of the load bearing frame about the longitudinal axis of the truck.

It is therefore the object of the present invention to provide a precise measuring device of the useful load and of the load on the axles of a truck in which load cells are exclusively submitted to constraints resulting from the weight of the tipper and of the useful load supported by the tipper, independently from the place where the useful load is disposed in the tipper and, within certain limits, from the tilting of the truck with respect to a horizontal plane.

SUMMARY OF THE INVENTION

The device according to the invention is characterized in that the setting and the arrangement of the load cells permits to the tipper a mobility with respect to the frame with a sufficient number of degrees of freedom so that the load cells are submitted exclusively to the constraints resulting from the weight of said tipper and of said useful load.

The invention will be described further by way of example with reference to the accompanying drawings.

DESCRIPTION OF THE PREFERRED EMBODIMENTS

Figure 1:
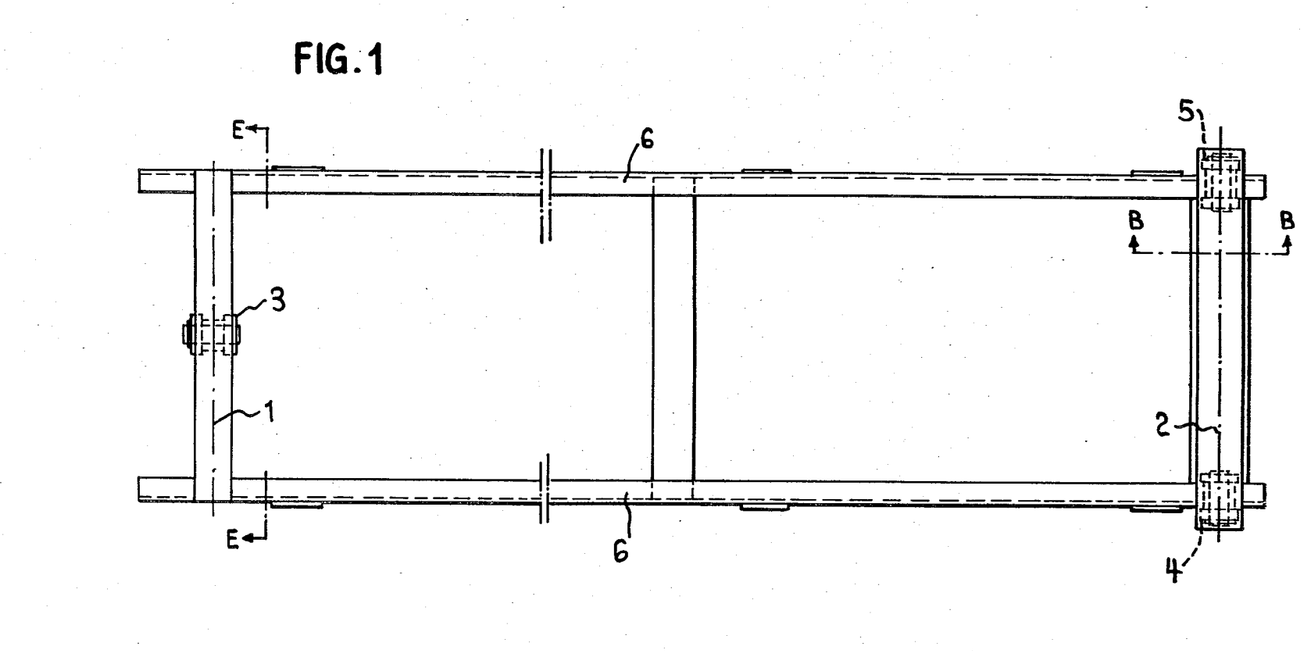
FIG. 1 shows the arrangement of the load cells in a truck according to a first embodiment of the device according to the invention.

FIG. 1 shows a view of the frame of a truck in which 1 and 2 indicate respectively a front axle and a rear axle on which are mounted three cylindrical load cells 3, 4 and 5. The axle 1 supports the tipper and the axle 2 is the axle about which the tipper may tip. The load cells 4 and 5 are mounted symmetrically along the axle 2, their axis coinciding with the latter. The spacing between them is equal to the one of the sections of the truck frame. The load cell 3 is mounted in the middle of the front axle supporting the tipper, its axis coniciding with the longitudinal axis of the truck is therefore perpendicular to the axle 1. It is to be seen that in the embodiment of FIG. 1 the front load cell is arranged perpendicularly to the rear load cells 4 and 5.

Figure 2:
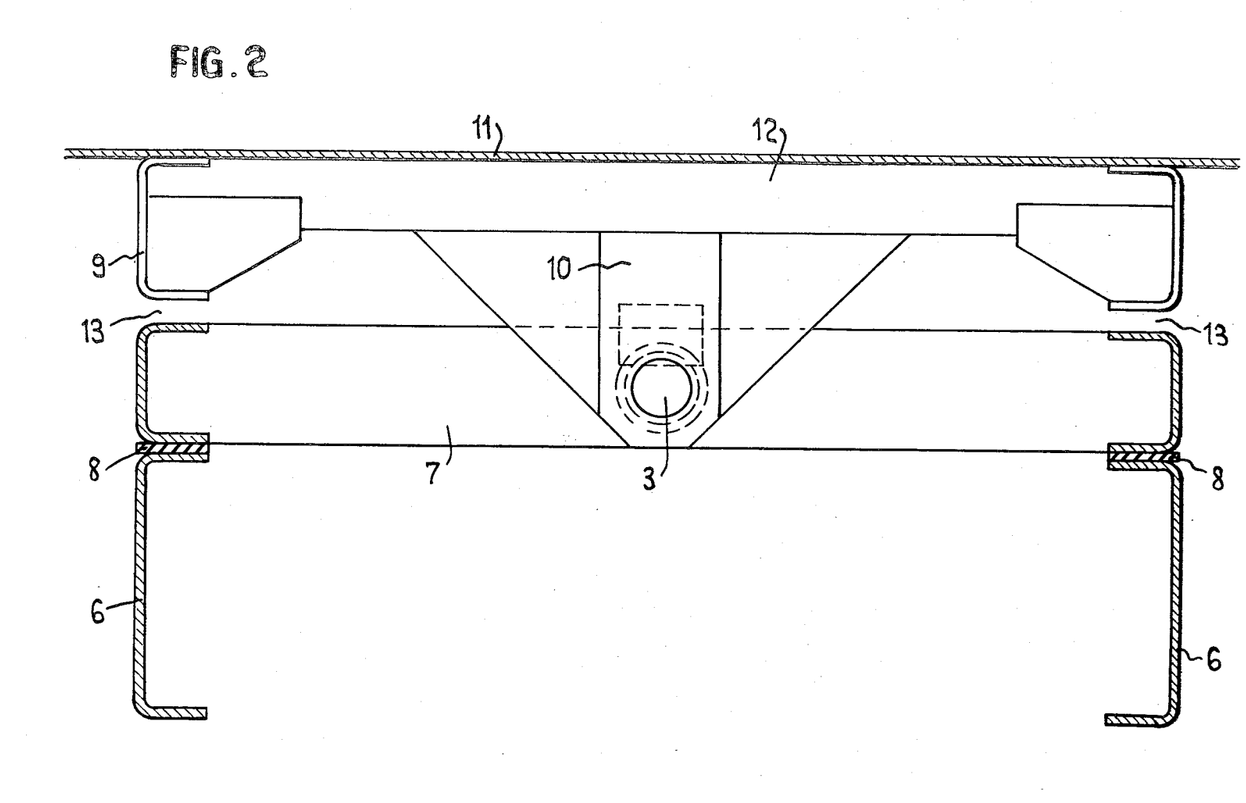
FIG. 2 is a cross section according to the line E—E of FIG. 1.
Figure 3:
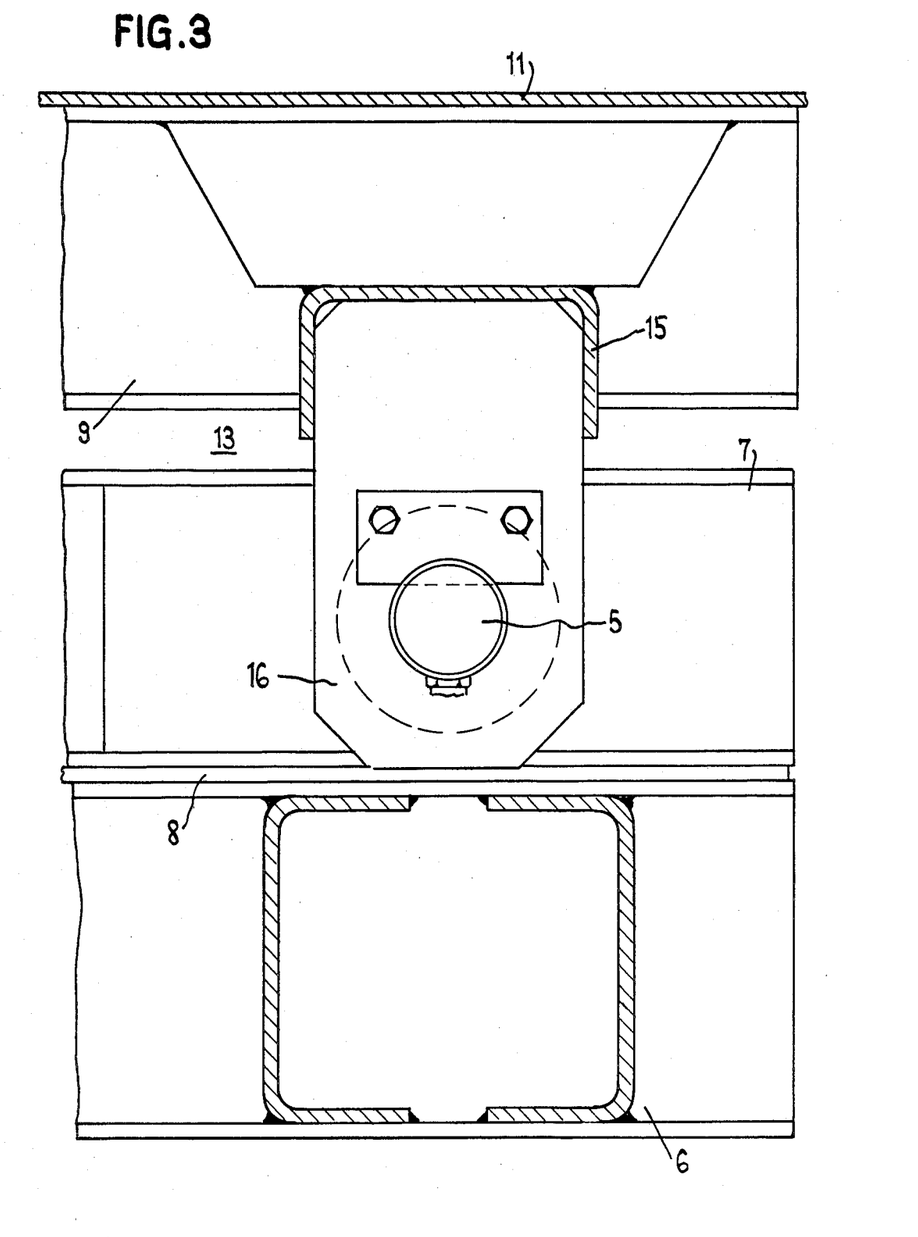
FIG. 3 is a cross section according to the line B—B of FIG. 1.

FIG. 2 shows a cross section along the line E—E of FIG. 1. The truck frame 6 supports an intermediate frame 7 by means of a rectangular ring 8 of resilient material for permitting a certain mobility of the intermediate frame. The latter supports the load cells 3, 4 and 5 and it is intended to be built in on already existing vehicles on which the device according to the invention is to be incorporated. On the other hand, in the case where the device according to the invention is foreseen during the design of a new type of vehicle, the frame of the latter may be so designed as to support directly the load cells which eliminates the necessity to provide an intermediate frame. Above the intermediate frame 7 is disposed the frame 9 of the tipper. FIG. 2 shows that the base plate 11 of the tipper lies on a tube 12, e.g. of rectangular section, on which are welded two supporting plates 10 each provided with an opening in which the load cell may slide axially. The supporting plates transmit to the load cell the forces exerted by the tipper and the useful load supported by the tipper. FIG. 2 shows further that the lateral extremities of the frame 9 of the tipper do not lie on the intermediate frame 7, being separated from the latter by clearances 13 which allows for a deformation of the tipper permitting a rotation of the latter about the axis of the load cell 3 when the load is placed unsymmetrically in the tipper with respect to the axis of the load cell 3. This permits to prevent undesirable strengthening constraints on the load cell 3. The rotation of the tipper about the axle 1 is limited by the width of the clearances 13. FIG. 3 shows a cross section along the line B—B of FIG. 1.

One recognizes the base plate 11 of the tipper and the clearance 13 between the frame 9 of the latter and the intermediate frame 7. The frame of the tipper bears a section 15 on which are welded a pair of plates 16 leaning on the extremities of the load cell 5 for transmitting to the latter the forces exerted by the weight of the tipper and of the useful load. A second pair of plates 16 welded on the section 15 transmits these forces to the load cell 4. The plates 16 as well as the plates 10 of FIG. 2 are capable of turning and sliding on the load cells 3, 4 and 5. In the case of a truck with a tilting tipper having an intermediate frame the tilting of the intermediate frame supporting the tipper is ensured by a hydraulic piston acting under the intermediate frame. The axis about which the intermediate frame and the tipper tilt is not represented. This arrangement has the advantage that the weight of the piston is not measured by the load cells 3, 4 and 5 and that the friction between the tipper and the intermediate frame does not influence the measurement of the weights of the tipper and of the useful load. This prevents every error of the measurement.

Figures 4, 11:
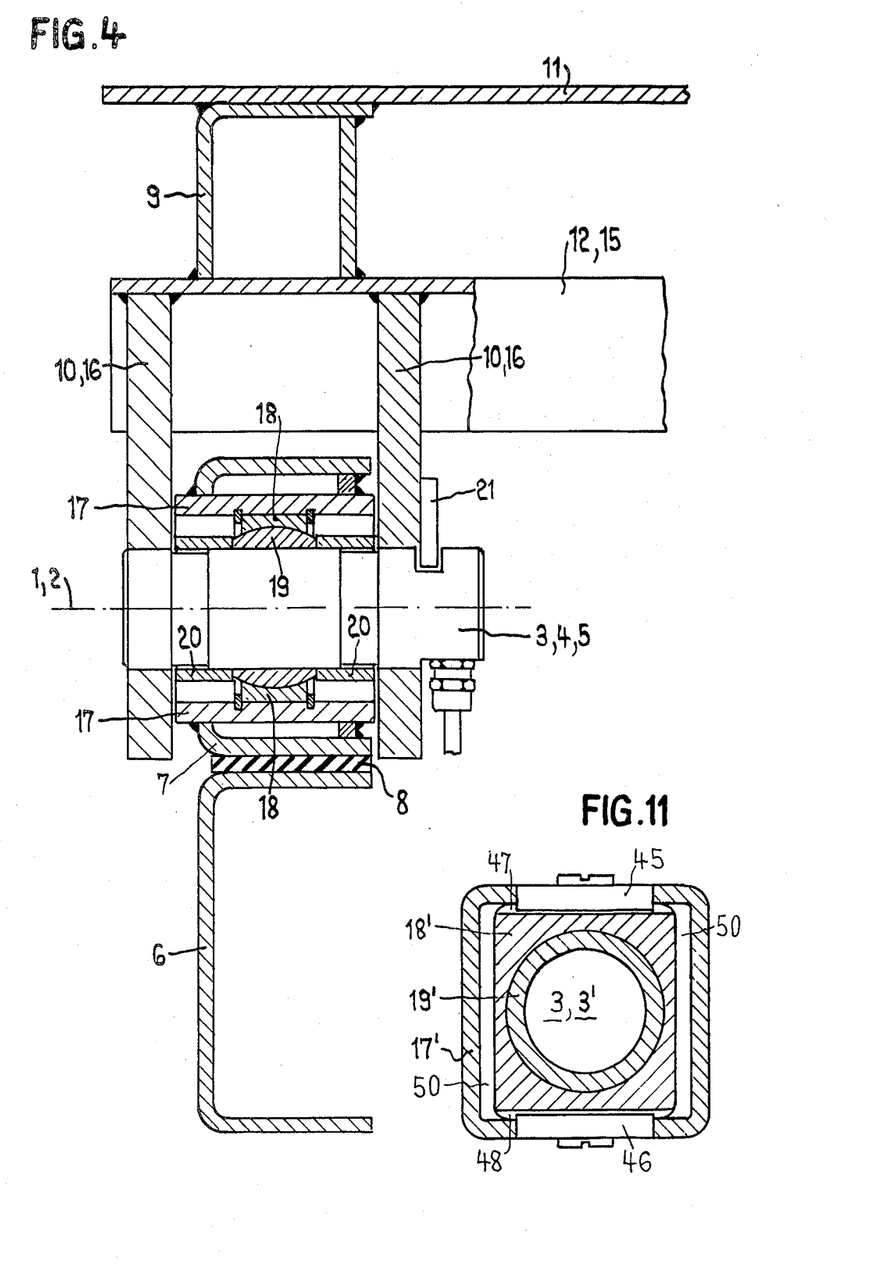
FIG. 4 shows the setting of the load cells of the device according to the invention.
FIG. 11 shows the setting of the front load cells of FIG. 8.

FIG. 4 shows the principle of the setting of the load cells 3, 4 and 5 in the intermediate frame or, as the case may arise, in the truck frame. A tube 17 is welded to the intermediate frame 7. Within and in the middle of this tube is pressed in a housing or support of a knee-joint 18. The support 18 contains a knee-joint 19 pressed in on the load cell and capable of free turning in the support 18. Spacing sleeves 20 placed on either side of the knee-joint 19 and capable of sliding on the load cell permit a certain lateral displacement of the plates 10 and 16 due to the fact that a clearance is provided on the one hand between the outer sides of the sleeves 20 and the inner walls of the plates 10, 16 and on the other hand between the plates 10, 16 and the tube 17 as well as between the plates 10,16 and the intermediate frame 7. The load cell is prevented from turning about its axis with respect to the plates 10, 16 by a plaquette 21 fixed to one of the plates 10, 16 and inserted within a groove of the load cell. A lateral play is provided between the plaquette 21 and the load cell for permitting the lateral displacement of the plates 10,16 on the load cell. Due to the knee-joint, the load cell may further rotate about an axis perpendicular to the plane of FIG. 4 and about its axis 1,2 with respect to the intermediate frame 7 or with respect to the truck frame if the load cells are mounted on the latter.

Figure 5:
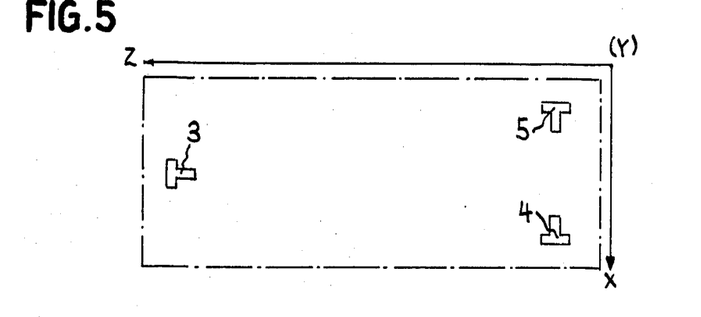
FIG. 5 shows the set of the load cells within a rectangular coordinate system.

If the set of the three load cells is placed within a rectangular system of coordinates as indicated in FIG. 5 the construction described above permits to the tipper the following displacements:
 linear displacement along the Z-axis,
 linear displacement of the rear portion of the tipper along the X-axis,
 rotation about the Z-axis, and
 rotation about the X-axis.

Figure 6:
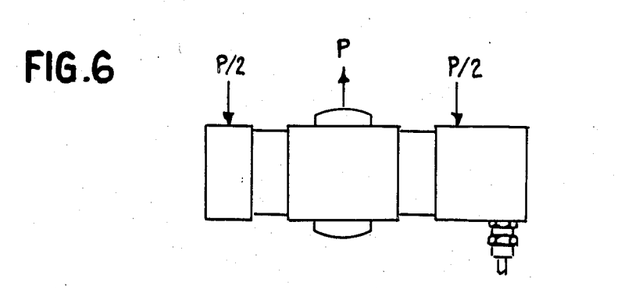
FIG. 6 shows the forces of pressure acting on the load cells.

Hence, the tipper has four degrees of freedom. Practically the above mentioned displacements and rotations occur in response to useful loads being not uniformly distributed at the surface of the tipper and when the truck is tilted, the plane of the tipper being not horizontal. Due to the knee-joint setting of the load cells and to their arrangement according to FIG. 1 the load cells are not submitted to constraints of flexion and torsion. They are submitted only to constraints of pressure P as indicated in FIG. 6. This eliminates the parasitic constraints and contributes to appreciably increase the precision of the measurement because the load cells are submitted only to the constraints resulting from the weights of the tipper and of the useful load. A relatively high precision of the measurement in the order of 1 to 2% as accomplished by the above described system offers to the user the following advantages:
 the load on the axles being known with a small error margin the checkings effected by the police are accelerated and simplified which leads to a gain of time,
 the useful load being known with a small error margin the fixing of its price corresponds to the weight effectively delivered to the user which eliminates the subjects of contestation relatively to the price to be paid, and
 the useful load being known with precision, this contributes as a general rule to diminish the wear of the vehicle, of the tires and of the brakes as well as to decrease the fuel consumption and the reparations. The useful life of the vehicle is augmented.

Figure 7:
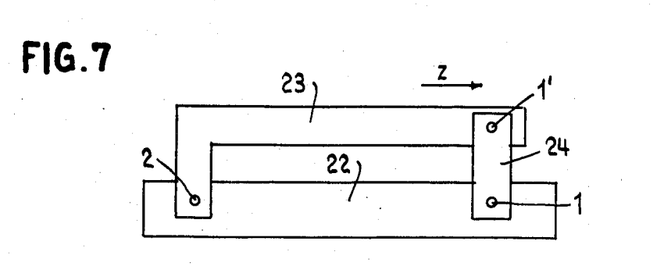
FIG. 7 shows a schematic view of the tipper and of the truck frame corresponding to a second embodiment of the device according to the invention.

FIG. 7 shows in a second embodiment of the device according to the invention an arrangement of the truck frame 22 and of the tipper 23 permitting to dispose the front load cell 3 with its axis parallel to the axle 1 of the truck, that is parallel to the axis of the load cells 4 and 5. In order to give to the tipper the same number of degrees of freedom than in the preceding case it is possible to connect, in the front portion of the truck, the tipper 23 to the frame 22 by an attachment 24 capable of turning about the axles 1 and 1'.

Figure 8:
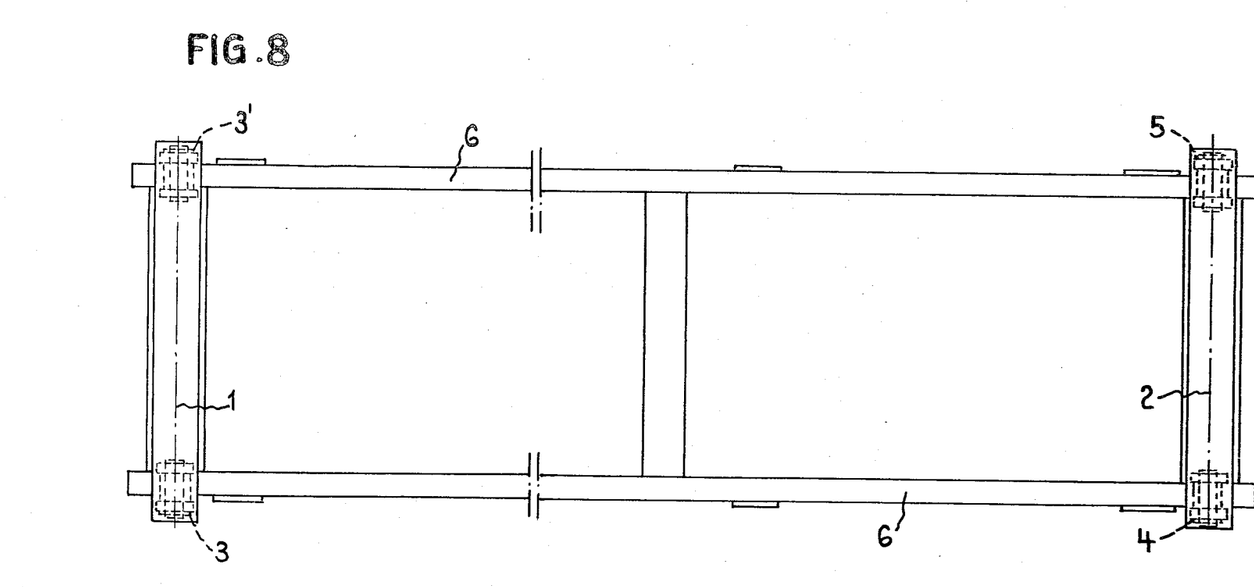
FIG. 8 shows the arrangement of the load cells of the device according to a third embodiment of the invention.

FIG. 8 shows that the number of load cells is not obligatory limited to three and that within the general meaning of the invention the arrangement of the tipper and of the truck frame permits the utilization of four load cells 3, 3', 4 and 5 when for particular applications it is not possible to utilize only three load cells. In this particular embodiment the front load cells 3 and 3' are disposed with their axis parallel and coinciding with the front axle of the truck. However, without taking particular steps in order to ensure the same number of degrees of freedom of the tipper than in the embodiment of FIG. 1, the arrangement of FIG. 8 would limit the number of degrees of freedom to three instead of four because the linear displacement of the tipper along the Z-axis of FIG. 5 would not be possible.

FIG. 11 shows a section through the front load cells 3 or 3', the knee-joint 19', the housing 18' and the tube 17' of the embodiment of FIG. 8. In this case the tube 17' has a rectangular section as well as the housing 18'. The housing 18' is mounted in the tube 17' by two keys 45 and 46 fixed each in a lit of tube 17' and slidingly engaging within two grooves 47 and 48 of the housing 18'. Clearances 50 are provided on either side of the housing 18'. This arrangement permits a displacement of the axle 1 with the load cells 3 and 3' along the Z-axis of FIG. 5 while preventing a displacement of the housing 18' along the axis of the load cells and a vertical displacement of the load cells. Therefore, the arrangement of FIG. 8 comprising four load cells has also four degrees of freedom as in the case of the embodiment of FIG. 1.

As a variant of the embodiment of FIG. 8 it is also possible to arrange the four load cells so that the front load cells 3 and 3' have their axis perpendicular to the common axis of the rear load cells 4 and 5.

Figure 9:
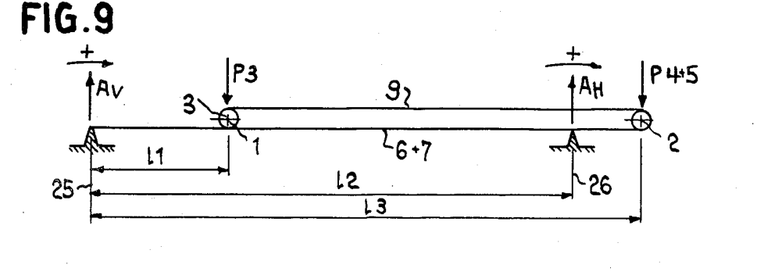
FIG. 9 shows the disposition of the forces and of the lever arms permitting the calculation of the useful load and of the forces on the axles.

FIG. 9 shows in the case of the embodiment of FIG. 1 the forces acting on the load cells and the disposition of the lever arms for the calculation of the forces $A_V$ and $A_H$ on the axles of the vehicle. The force $P_3$ acts on the front load cell 3 and the force $P_{4+5}$ on the set of the rear load cells 4 and 5. The sum $$P_{total} = P_3 + P_{4+5} \quad (1)$$

represents the weight of the tipper (tare) augmented of the weight of the useful load. If the tare as already been effected, (1) may represent the useful load on the tipper. With the help of FIG. 9 one calculates the forces on the axles:

$$\text{front: } A_V = \frac{P_3(l_2 - l_1) - P_{4+5}(l_3 - l_2)}{l_2} = g_1 P_3 - g_2 P_{4+5} \quad (2)$$

$$\text{rear: } A_H = \frac{P_3 l_1 + P_{4+5} l_3}{l_2} = g_3 P_3 + g_4 P_4 \quad (3)$$

Figure 10:
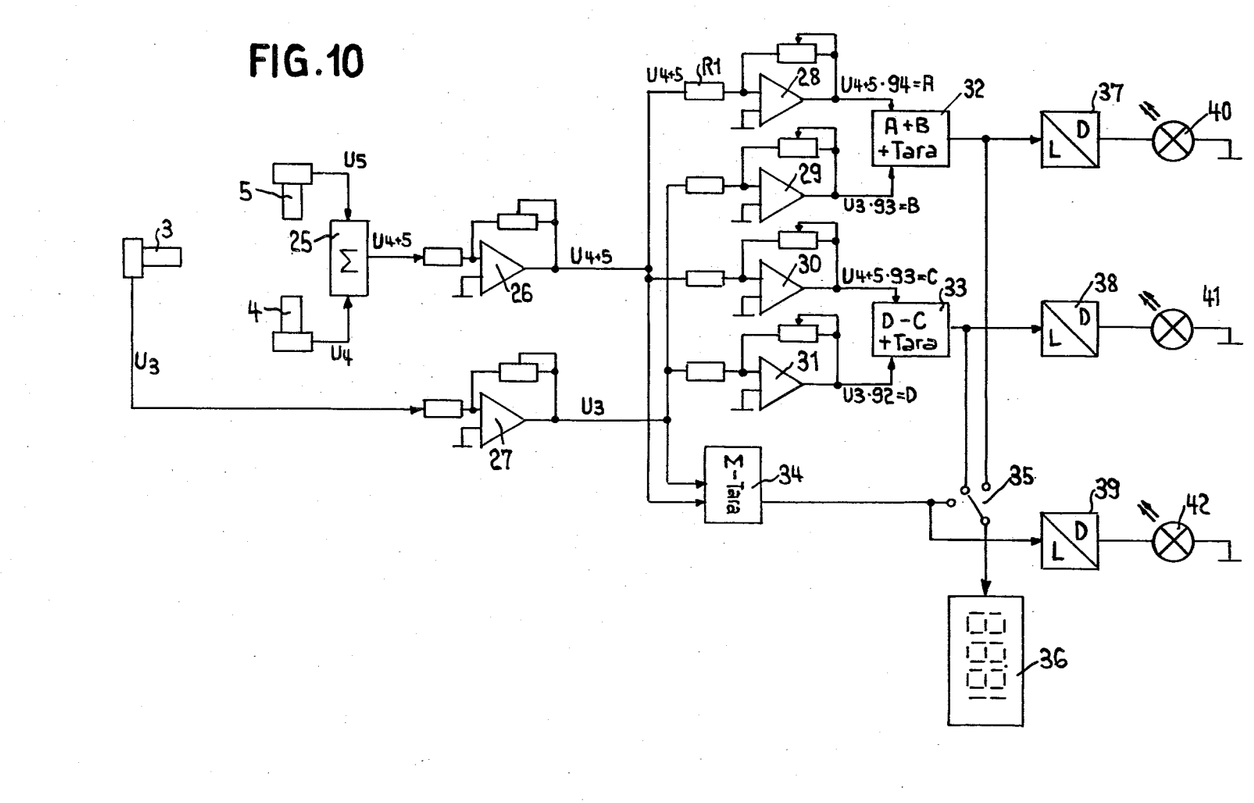
FIG. 10 shows the block diagram of the electronic circuit utilized with the device according to the first embodiment of the invention.

The relations (1), (2) and (3) may be calculated by an electronic circuit the diagram of which is the one of FIG. 10. It is assumed that the load cells delivers e.g. a voltage proportional to the forces P exerted.

FIG. 10 shows that the signal of the load cell 3 is amplified by an operational amplifier 27 and that the sum $U_{4+5}$ effected by the summator 25 of the signals of the load cells 4 and 5 is amplified by an operational amplifier 26. The operational amplifiers 28-31 effect respectively the operations $g_4 U_{4+5} = A$; $g_3 U_3 = B$; $g_2 U_{4+5} = C$ and $g_1 U_3 = D$. The summator 32 delivers a signal equal to A+B+tare corresponding to the contribution of the useful load on the rear axle, the summator 33 a signal D−C+tare corresponding to the useful load on the front axle and the summator 34 the sum $U_3 + U_{4+5}$−tare which corresponds to the useful load. The commutator 35 permits to connect the display 36 as desired to the outputs of the summators 32 (rear axle), 33 (front axle) and 34 (useful load). Moreover the electronic comprises limits surveillance circuits 37 to 39 associated respectively to overloading indicators 40 to 42 in order to prevent the user to overload the vehicle.

The preceding shows that the device according to the invention provides a particularly efficient solution to the problem to be solved permitting to attain, more particularly, a high precision of the measurement of the useful load and of the load on the axles of the vehicle. The principle of the device according to the present invention may also be applied for three axles vehicles and for trailer cars.

We claim:

1. Measuring device of the useful load and of the load on the axles of a truck comprising a frame and a tipper, the measurement being effected by load cells mounted between said frame and said tipper, characterized in that the setting and the arrangement of said load cells permits to the tipper a mobility with respect to the frame with a sufficient number of degress of freedom so that the load cells are submitted exclusively to the constraints resulting from the weight of said tipper and of said useful load.

2. Device according to claim 1, wherein said load cells are fastened on the frame or on an intermediate frame of said truck, said load cells being mounted on a knee-joint so that they may rotate about their longitudinal axis and about an axis perpendicular to the latter, the forces resulting from the weight of the tipper and of the useful load being transmitted to said load cells by means of two supporting plates fixed to said tipper.

3. Device according to claim 2, wherein said supporting plates comprise an opening in which the load cells slide, said knee-joint being fastened by distancing plates having a play with respect to said supporting plates for enabling a displacement of the load cells with respect to said supporting plates.

4. Device according to claim 2, wherein a plaquette fastened to one of said supporting plates engaged within a groove of said load cells for preventing any rotation of said load cells about their longitudinal axis with respect to said supporting plates.

5. Device according to claim 1, comprising three load cells fastened to the frame of the truck in a plane parallel with the plane of a base plate of the tipper for forming a system having three bearing points supporting said tipper, the axis of one of said load cells being perpendicular to the common axis of the two other load cells.

6. Device according to claim 5, wherein said load cells are fastened to an intermediate frame arranged between the frame of the truck and a frame of the tipper, said intermediate frame being supported on the frame of the truck by a resilient member.

7. Device according to claim 1, wherein the tipper is fixed to the frame of the truck by an attachment having an axis of revolution on said frame and an axis of revolution on said tipper, said device comprising three load cells fastened to the frame or to an intermediate frame in a plane parallel with the plane of a base plate of the tipper for forming a system having three bearing points supporting said tipper the axis of said load cells being parallel between themselves and perpendicular with respect to the longitudinal axis of said truck.

8. Device according to claim 5 or 7, wherein a clearance is provided between said tipper and said frame for permitting, at the locality of the single load cell, a limited deformation of the tipper about the axis of said single load cell when the distribution of the useful load in said tipper is unsymmetrical.

9. Device according to claim 1, comprising four load cells fastened to the frame of the truck or to an intermediate frame in a plane parallel to the plane of a base plate of the tipper, said load cells being arranged by pairs respectively in the front and the rear of said frames, the common axis of each of said pairs of load cells being parallel between themselves and perpendicular to the longitudinal axis of the truck.

10. Device according to claim 9, wherein one pair of said front or rear load cells are mounted on a knee-joint capable of rotating in a rectangular-shaped housing enclosed within a tube of rectangular section fastened to said intermediate frame or to said truck frame, said tube comprising two keys slidingly engaging within two grooves of said housing, clearances being provided between said housing and said tube for permitting a limited displacement of said pair of load cells along the longitudinal axis of the truck.

11. Device according to claim 9, wherein said one pair of load cells are arranged so that their axes are perpendicular to the common axis of the other pair of load cells.

12. Device according to claim 1 or 9, wherein each of said load cells delivers an output signal proportional to the forces exerted on said load cells by the weight of the tipper and of the useful load of the truck.

* * * * *